US010510105B2

(12) United States Patent
Deak et al.

(10) Patent No.: US 10,510,105 B2
(45) Date of Patent: Dec. 17, 2019

(54) TRAVELER RECOMMENDATIONS

(71) Applicant: Oath Inc., New York, NY (US)

(72) Inventors: Lajos Zoltan Deak, Sunnyvale, CA (US); Csaba Kecskemeti, San Jose, CA (US)

(73) Assignee: Oath Inc., New York, NY (US)

( * ) Notice: Subject to any disclaimer, the term of this patent is extended or adjusted under 35 U.S.C. 154(b) by 489 days.

(21) Appl. No.: 15/178,667

(22) Filed: Jun. 10, 2016

(65) Prior Publication Data
US 2017/0358022 A1 Dec. 14, 2017

(51) Int. Cl.
| | |
|---|---|
| *G06Q 30/00* | (2012.01) |
| *G06Q 30/06* | (2012.01) |
| *H04W 4/02* | (2018.01) |
| *H04W 4/029* | (2018.01) |
| *G06Q 50/14* | (2012.01) |

(52) U.S. Cl.
CPC ........ *G06Q 30/0631* (2013.01); *H04W 4/023* (2013.01); *H04W 4/027* (2013.01); *H04W 4/029* (2018.02); *G06Q 50/14* (2013.01)

(58) Field of Classification Search
CPC . G06Q 30/0226–0233; G06Q 30/0251; G06Q 30/0259; G06Q 30/0261; G06Q 30/0276; G06Q 30/06; G06Q 30/0601–0643; G06Q 30/08; G06Q 50/14; G06Q 10/02; G06Q 10/025
See application file for complete search history.

(56) References Cited

U.S. PATENT DOCUMENTS

| | | | | |
|---|---|---|---|---|
| 2015/0032768 | A1* | 1/2015 | Miller | G06Q 10/02 707/769 |
| 2015/0168150 | A1* | 6/2015 | Kahn | H04W 4/21 701/408 |
| 2016/0117618 | A1* | 4/2016 | Wang | G06Q 10/025 705/6 |
| 2017/0268894 | A1* | 9/2017 | Rolf | G01C 21/34 |

OTHER PUBLICATIONS

Learning Travel Recommendations From UserGenerated GPS Traces. Yu Zheng and Xing Xie Microsoft Research Asia. 2011. (Year: 2011).*
A context-aware personalized travel recommendation system based on geotagged social media data miningAbdul Majid,Ling Chen ,Gencai Chen,Hamid Turab Mirza,Ibrar Hussain &John Woodward. Jul. 24, 2012. (Year: 2012).*

* cited by examiner

*Primary Examiner* — William J Allen
(74) *Attorney, Agent, or Firm* — Cooper Legal Group, LLC

(57) ABSTRACT

One or more computing devices, systems, and/or methods for providing recommendations to travelers are provided. For example, locational data associated with a device of a user is evaluated to identify a set of location points at which the device was located over time. Location point pairings are generated from the set of location points, where a location point pairing may comprise a departure location point and an arrival location point. The location point pairings are filtered based upon various criteria to remove location point pairings that are not indicative of air flight travel (e.g., a location point pairing not satisfying an air flight speed threshold or an air flight travel distance threshold). The user may be determined as an air flight traveler that has recently used air flight travel to reach a destination location. A recommendation of content for the destination location is provided to the user.

20 Claims, 10 Drawing Sheets

1000

1002

| SPEED RANGE | MODE |
|---|---|
| 5-16kph | RUNNING |
| 112-321kph | TRAIN |
| 321-804kph | COMMERCIAL |
| 804-1144kph | PRIVATE |

1004

| USER | DEPARTURE | ARRIVAL | TRAVEL TIME | SPEED | MODE |
|---|---|---|---|---|---|
| USER A | CITY A | CITY B | 2hr 15min | 164kph | TRAIN |
| USER B | CITY A | CITY C | 3hr 10min | 643kph | COMMERICAL |
| USER C | CITY C | CITY D | 5hr 1min | 1046kph | PRIVATE |
| USER D | CITY E | CITY F | 1hr | 8kph | RUNNING |

1006

| MODE | CONTENT |
|---|---|
| RUNNING | RUNNING WATCH |
| TRAIN | TABLET |
| COMMERCIAL | SMART WATCH |
| PRIVATE | LUXURY SMART WATCH |

FIG. 10

TRAVELER RECOMMENDATIONS

BACKGROUND

Many users may travel between locations using various modes of transportation. In an example, a user may travel to work by car or train. In another example, the user may travel to a park by bike. In another example, the user may travel for business or personal reasons by airplane. For example, the user may travel from the user's home city of Cleveland to Raleigh for a business meeting with a client. The user may later travel from Cleveland to Florida for a family vacation. The user may have varying interests in different content (e.g., hotel recommendations, car rental recommendations, news stories, coupons, weather details, vacation activities, business trip activities, etc.) based upon a mode of transportation, a reason for traveling, and a destination location. Unfortunately, the user may either spend substantial amounts of time, computing resources, and/or bandwidth attempting to identify relevant content, or the user may forego searching for such content and thus may miss out on experiencing such content (e.g., instead of searching for a cost effective hotel, the user may merely stay at the first hotel that the user encounters; the user may be a runner but may skip out on running because the user does not know that there are local running trails near a hotel at which the user is staying; etc.).

SUMMARY

In accordance with the present disclosure, one or more computing devices and/or methods for providing recommendations to travelers are provided. In an example, locational data associated with a device of a user is evaluated to identify a set of location points (e.g., longitude and latitude values of a mobile device, such as a phone or a wearable device, may be used to identify location points at which the mobile device has been located over time). Location point pairings may be generated from the set of location points. A location point pairing may comprise a departure location point and an arrival location point. In an example, the location point pairings may be filtered based upon an air flight speed threshold, an air flight travel distance threshold, location points within a distance threshold or an inferred distance threshold of airport locations, verification against an air flight schedule, and/or other filtering criteria used to create filtered location point pairings indicative of air flight travel as opposed to other modes of transportation or false positives such as virtual private network (VPN) connections. The filtered location point pairings may be evaluated to identify a target location point pairing indicative of air flight travel from a target departure location point to a target arrival location point.

The user may be determined to be an air flight traveler to a destination location corresponding to the target arrival location point (e.g., and not an airport worker or a traveler ride provider such as a taxi or a family member taking a person to an airport). In an example, the user may be identified as either a personal air flight traveler (e.g., infrequently traveling for 5-7 day trips) or a business air flight traveler (e.g., routinely traveling during week days). A recommendation of content for the destination location may be generated. In an example, the content may comprise a car rental suggestion, a hotel suggestion, a restaurant suggestion, and/or other travel suggestions when the destination location is not a home location of the user. In another example, the content may comprise weather information, a local news story, local traffic information, and/or other information when the destination location is the home location of the user. The content may be tailored based upon whether the user is the personal air flight traveler (e.g., the content may comprise vacation information, such as a monument location, jet ski rental information, a tiki bar location and menu, etc.) or the business air flight traveler (e.g., the content may comprise business travel information, such as restaurants near a hotel district, a golf course, etc.). In this way, the recommendation may be provided to the user. In an example, historic travel data of the user may be used to infer a future trip of the user, and a travel suggestion comprising air flight booking information, hotel booking information, car rental information, and/or destination activity information for an inferred destination may be provided to the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 10 is an illustration of an example of one or more data structures used for providing recommendations to travelers based upon modes of transportation.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
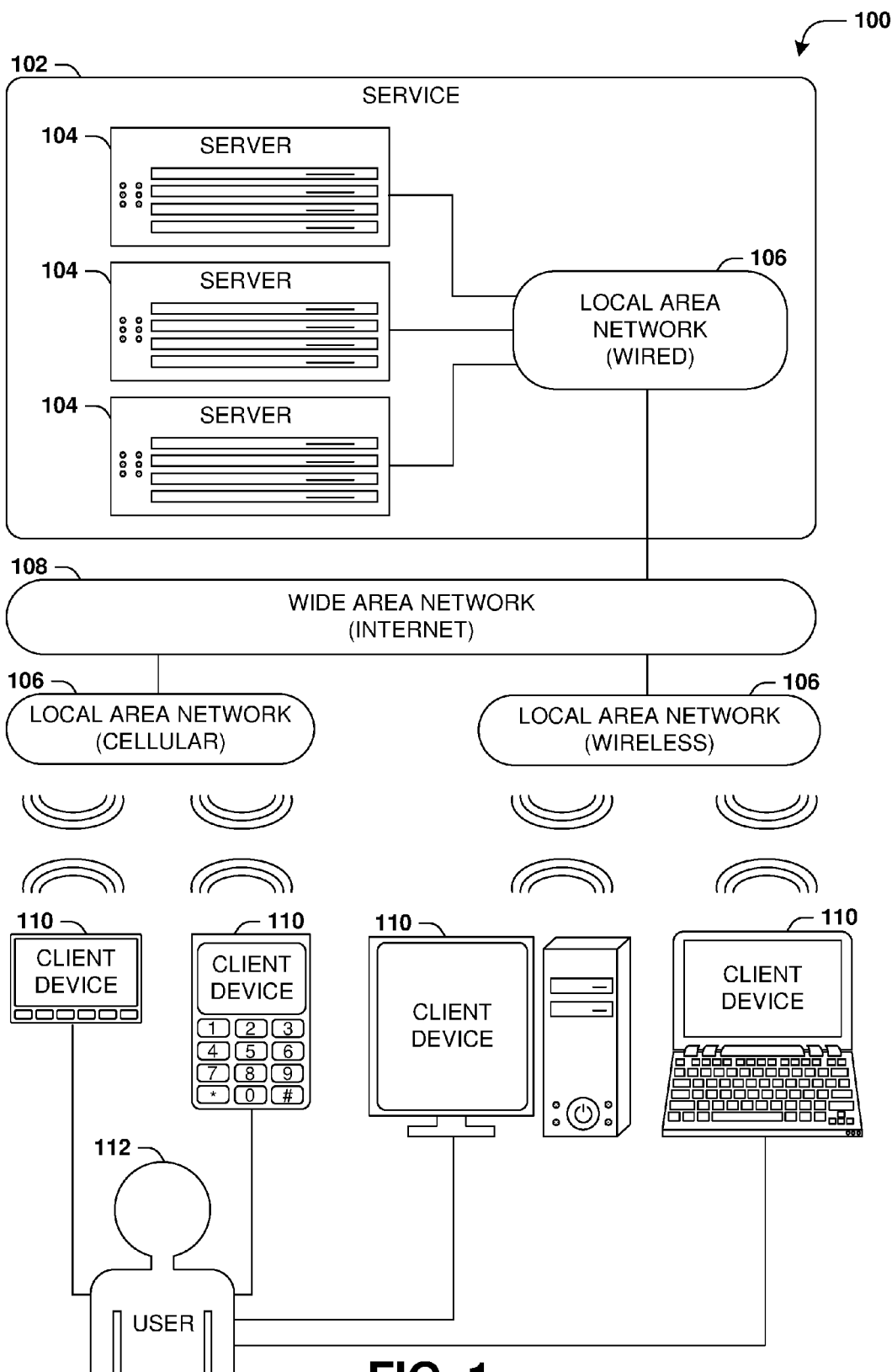
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
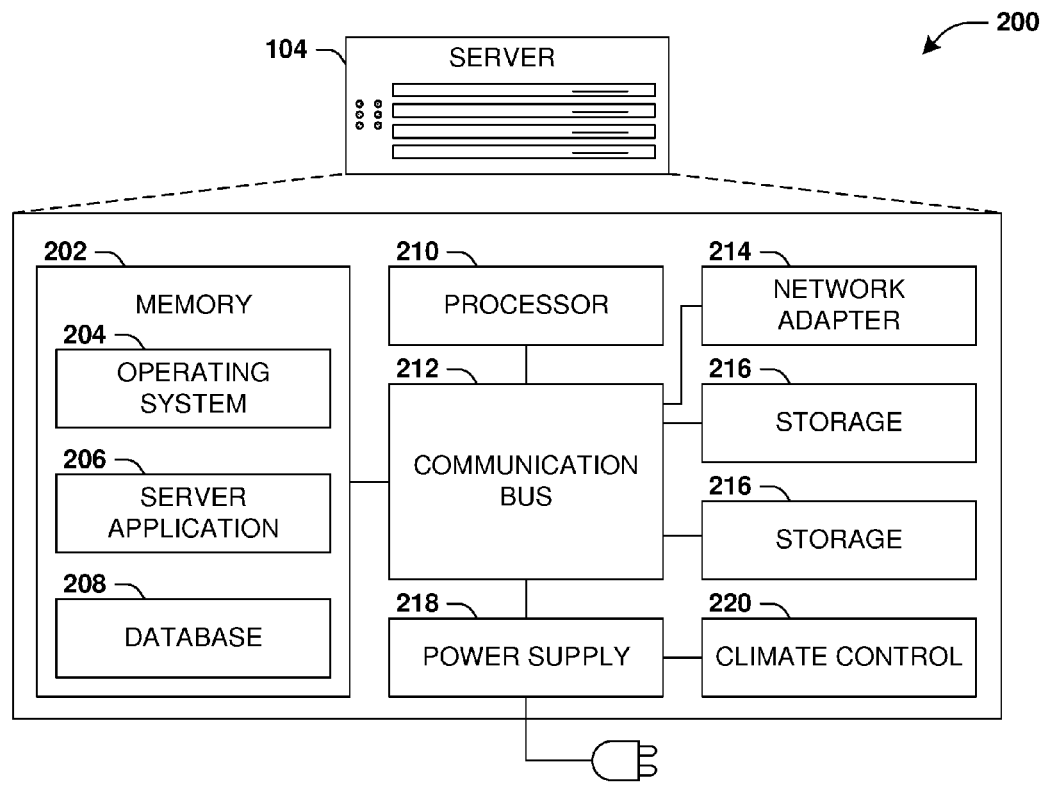
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
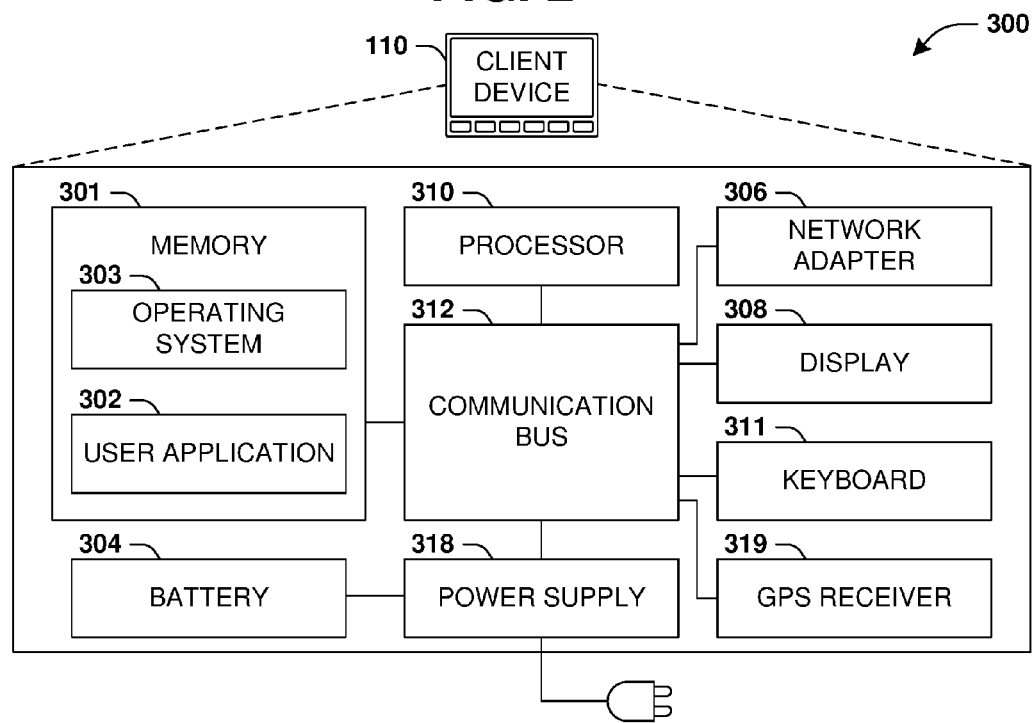
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a tabletop piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for providing recommendations to travelers are provided. For example, locational data associated with a device of a user may be evaluated to identify location point pairings (e.g., the device may provide locational data while the user is close to a hometown airport near the user's home, and then subsequently provide new locational data while the user is near an airport 804 kilometers from the user's home). The location point pairings may be filtered based upon various filtering criteria used to filter out location point pairings that are not indicative of the user flying between two location points. For example, location point pairings that do not exceed air flight travel distance threshold (e.g., less than 160 kilometers apart) may be filtered out. Location point pairings that exceed a physical travel threshold (e.g., traveling faster than physically possible due to the locational data coming from the user connecting to a virtual private network) or do not exceed an air flight speed threshold (e.g., speeds indicative of the user driving a car) may be filtered out. The location point pairings may be verified against an airport location repository of airport locations and/or against air flight schedules. In this way, recommendations may be provided for an air flight traveler that are tailored to what may be relevant to the air flight traveler (e.g., recommendations may be tailored for business air flight travelers, personal air flight travelers such as vacationers, a particular destination location, etc.). Also, historic travel data may be evaluated to identify an inferred future trip for the user, and a travel suggestion for the inferred future trip may be provided to the user.

Because recommendations comprise content tailored to information relevant to the destination location and the reason for traveling to the destination location, the user may be efficiently provided with content that the user may otherwise not be aware of or may spend substantial amounts of computing resources, bandwidth, battery life, and/or time attempting to locate. Similarly, travel suggestions for inferred future trips may provide the user with information such as flights, hotels, car rental information, activities, and/or other information for trips that the user may have an interest in planning, thus mitigating the need for the user to spend computing resources, bandwidth, and/or time attempting to locate such information. Filtering the location point pairings based upon the various filtering criteria may drastically reduce the amount of locational data that is to be processed by removing false positive data that is not indicative of air flight travel, thus reducing computational resources used to evaluate the location point pairings (e.g., hundreds of thousands of location point pairings may be narrowed down to just a few location point pairings indicative of air flight travel). The airport location repository, the location point pairings, and/or other data may be stored within an R-tree for fast lookup in order to reduce computational processing time. Computational processing of the locational data, location point pairings, identification of content for recommendations, etc., may be improved by utilizing a Hadoop cluster (e.g., a computational cluster designed for storing and analyzing large amounts of unstructured data in a distributed computing environment, which may utilize low-cost computing devices where a first computing device is designated as a NameNode master, a second computing device is designated as a Tasktracker master, and the rest of the computing devices are slaves) and/or user defined functions for PIG scripts (e.g., MapReduced programs created using a MapReduce programming model for implementing the processing and generation of large data sets, such as the location point pairings, with a parallel and distributed algorithm within a cluster such as a Hadoop cluster).

Figure 4:
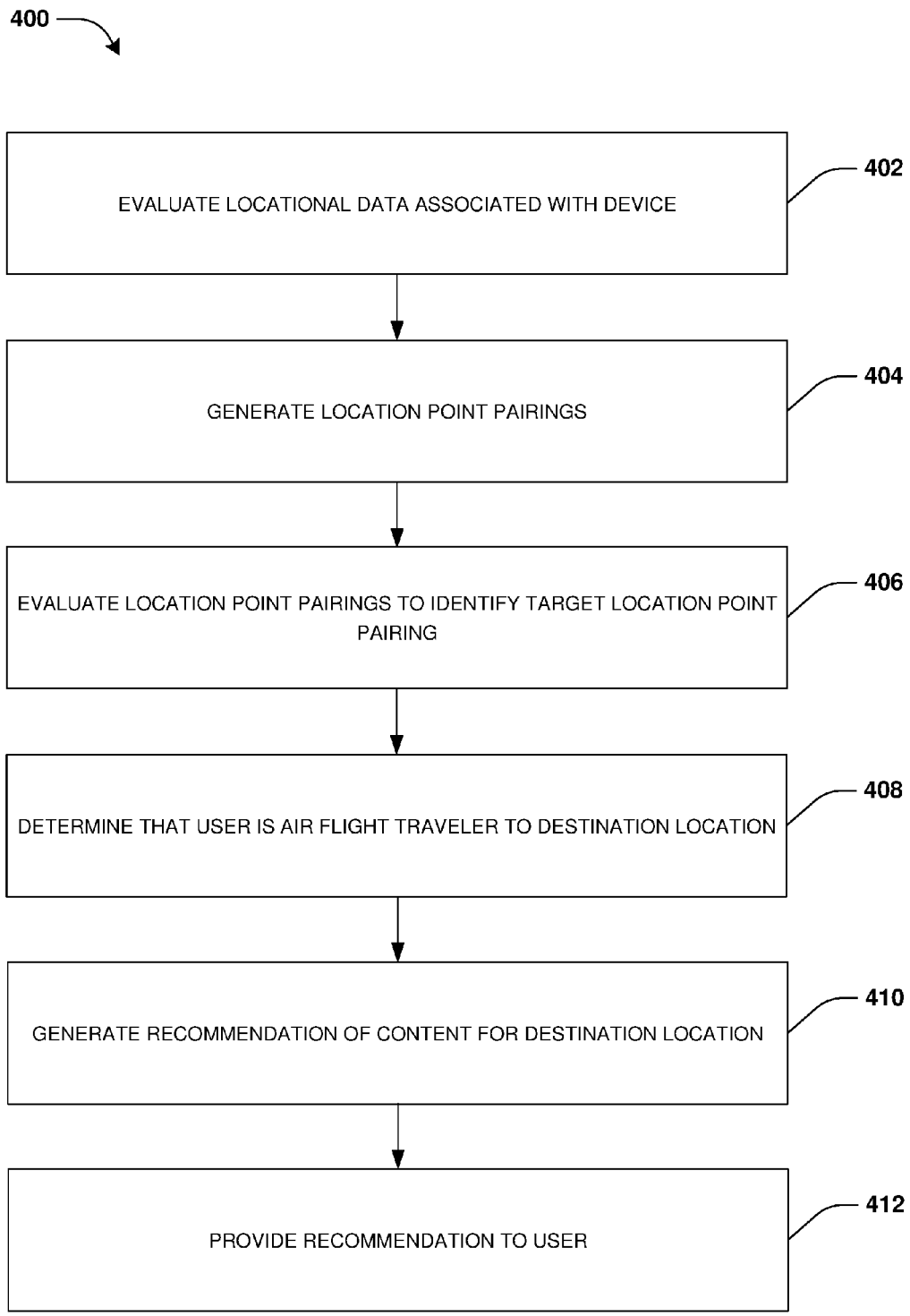
FIG. 4 is a flow chart illustrating an example method for providing recommendations to travelers.

An embodiment of providing recommendations to travelers is illustrated by an example method 400 of FIG. 4. A user may carry a device, such as a mobile device (e.g., a smart phone, a wearable device, a laptop, etc.), capable of generating locational data such as global positioning system (GPS) data, longitude/latitude data, an internet protocol (IP) address associated with a particular location, social network check-in data, etc. Such information may be provided by the device, such as through an IP address when requesting a webpage, through an application executing on the device, etc. As the user carries the device to various locations, more locational data may be generated, which may be indicative of the user traveling between two locations by various modes of transportation. In an example of obtaining location data, the location data may be obtained via a mobile app. The mobile app may be instrumented with analytics that can track the location data (e.g., from a network or from a GPS unit). In another example of obtaining location data, a content server that is serving content to the mobile app and/or a mobile web browser, may receive location data through a content request from the mobile app and/or the mobile web browser (e.g., the mobile app and/or the mobile web browser may derive the location data based upon an IP address or other information). The user may take affirmative action, such as providing opt-in consent, to allow access to and/or use of locational data and/or user signals, such as for the purpose of generating recommendations and/or generating travel suggestions (e.g., where the user responds to a prompt regarding the collection and/or use of such information). The user may also opt-out from providing access to such information and/or data or portions thereof (e.g., access may be provided to merely social network check-in data and a social network profile user signal, but not real-time GPS data).

The user may benefit from being provided with recommendations for a current trip and/or travel suggestions for inferred future trips that are tailored to the user, a reason for traveling, and a destination location. At 402, the locational data may be evaluated to identify a set of location points (e.g., longitude/latitude values associated with physical locations). At 404, location point pairings may be generated from the set of location points. A location point pairing may comprise a departure location point and an arrival location point (e.g., the departure location point may occur earlier in time than the arrival location point). In an example, the set of location points may be filtered based upon an air flight travel distance threshold, such that location point pairings that do not exceed the air flight travel distance threshold (e.g., at least 160 kilometers or any other distance indicative of flying distances compared to typical walking, running, driving, commuting, or biking distances) are removed from the set of location points. In an example, a distance value for the air flight travel distance threshold may be specified based upon a location, such as a country, of a location point (e.g., users in Greece may typically fly at 80 kilometer distances or greater whereas users in the United States may typically fly at 160 kilometer distances or greater, and thus a 80 kilometer distance value may be specified for travel within Greece and a 160 kilometer distance value may be specified for travel within the United States). Distance may be calculated from latitude and longitude information using various techniques, such as a Haversian formula or a great-circle distance.

At 406, the location point pairings may be evaluated to identify a target location point pairing indicative of air flight travel from a target departure location point (e.g., a location point near a home airport near the user's home in Cleveland) to a target arrival location point (e.g., a location point near a Florida airport). For example, the target arrival location point may have been generated within a threshold time from a current time, and thus is indicative of a destination location to which the user has recently arrived. In an example, the location point pairings may be filtered for evaluation based upon whether an average speed for traveling between two location points, such as between the departure location point to the arrival location point (e.g., calculated based upon distance between the two location points and timestamp data associated with the location point pairing), does not exceed an air flight speed threshold or exceeds a physical travel threshold. For example, responsive to the average speed not exceeding the air flight speed threshold (e.g., 300 kilometers per hour or any other threshold value for commercial airliners), the location point pairing may be filtered/removed because the average speed is indicative of slower modes of transportation. Responsive to the average speed exceeding the physical travel threshold (e.g., 1144 kilometers per hour or any other threshold value), the location point pairing may be filtered/removed because the average speed is indicative of a false positive for air flight travel such as from connecting to a virtual private network hosted in a remote location to a current location of the device. In an example, multiple thresholds may be defined. For example, a lower threshold may represent that a covered distance could not be achieved by any ground transportation methods. An upper threshold may represent that the covered distance is unable to occur by commercial transportation methods (e.g., false location data not indicative of actual travel). Thus, air flight travel may be identified between the lower threshold and the upper threshold. In this way, filtered location point pairings may be evaluated to identify the target location point pairing.

In an example, the target location point pairing may be verified with an air flight schedule to determine whether a record of an air flight between the target departure location point and the target arrival location point exists. If the record exists, then the target location point pairing may be verified and a likelihood of the target location point pairing corresponding to air flight travel may be increased, otherwise, the likelihood may be decreased. In an example, an airport location repository may be evaluated using the target departure location point to identify a set of potential departure airports and using the target arrival location point to identify a set of potential arrival airports (e.g., multiple airports may be within a distance from last and first available location activity). For example, there may be a relatively high probability that users may generally switch a phone's networking functionality off at a departure airport and thus locational data for the departure airport may be available, but the user may not switch the phone networking functionality on and/or the phone may not produce location activity when the user arrives at an arrival airport (e.g., the user may turn the phone on after driving 16 kilometers from the arrival airport). Thus, the target departure location point and/or the target arrival location point may be within a proximity to multiple airports. Upon identifying airline travel, the set of potential departure airports and/or the set of potential arrival airports may be determined with corresponding probabilities derived from distances from each airport to the target departure location point (e.g., "from" location activity) and the target arrival location point (e.g., "to" location activity). A cross product of the potential departure airports and the potential arrival airports may be matched against flight schedules of each airport to identify a possible pairing with a highest probability, if any. For example within Silicon Valley, San Francisco, San Jose, and Oakland airports may be within about a 56 kilometer radius square. The airports may have international lines, but with different schedules. In an example, a last user event generating location data (e.g., creating the target arrival location point) may be in some proximity to most of the airports, and thus those airports may be considered as potential arrival airports. Accordingly, probabilities may be assigned the potential arrival airports, and actual flight schedules may be used to narrow down or remove false information.

In another example, the airport location repository may be evaluated using the target arrival location point and/or the target departure location point to identify whether an arrival airport within a distance threshold of the target arrival location point exists and/or whether a destination airport within the distance threshold of the target destination airport exists (e.g., the target arrival location point occurring within 8 kilometers of an airport within the airport location repository). If the arrival airport and/or the destination airport exist, then the likelihood may be increased, otherwise, the likelihood may be decreased. The airport location repository may be evaluated using the target arrival location point and/or the target departure location point to identify whether an inferred arrival airport within an inferred distance threshold of the target arrival location point exists and/or whether an inferred destination airport within the inferred distance threshold of the target destination airport exists (e.g., the target arrival location point occurring within 32 kilometers of an airport within the airport location repository, which may be indicative of the user turning the device on after leaving the airport and traveling 32 kilometers to a hotel). If the inferred arrival airport and/or the inferred destination airport exist, then the likelihood may be increased (e.g., increased by an amount less than if the arrival airport or destination airport existed as opposed to inferring such), otherwise, the likelihood may be decreased. In this way, the target location point pairing may be identified based upon the likelihood exceeding a threshold likelihood that the target location point pairing is indicative of air travel, for example.

At 408, the user may be determined to be an air flight traveler to a destination location corresponding to the target arrival location point. For example, the user may be determined to be the air flight traveler based upon the target location point pairing having a likelihood exceeding the threshold likelihood that the user traveled from the target departure location point to the target arrival location point by airplane. In an example, the target location point pairing and/or other information (e.g., other locational data indicative of recent locations of the user) may be evaluated to determine whether the user is the air flight traveler or is instead an airport worker or a traveler ride provider (e.g., a family member, friend, or taxi driver taking a person to the airport) that did not travel to an airport by air flight but instead has locational data indicative of the airport because the user works at the airport or dropped someone off at the airport.

In an example, the target location point pairing and/or historic travel data for the user may be evaluated to determine whether the user is a business air flight traveler or a personal air flight traveler, and thus may find different types of recommendations more relevant depending on whether the user is traveling for business or personal reasons such as a vacation. For example, the user may be determined to be the business air flight traveler if the historic travel data indicates that the user routinely travels during the week. The user may be determined to be the personal air flight traveler if the historic travel data indicates that the user infrequently travels.

At 410, a recommendation of content for the destination location may be generated. The content may be identified as a social network profile (e.g., a social network profile of a local restaurant), a coupon for a local business, hotel booking functionality (e.g., a link to a hotel booking app), car rental functionality (e.g., a link to a car rental website), a website (e.g., search results of travel activities at the destination location), an article, a video, an image, a textual message, a menu and table reservation functionality for a restaurant, task completion functionality (e.g., functionality to book a jet skiing experience), etc. The content may be selected based upon whether the user is the personal air flight traveler or the business air flight traveler. For example, vacation content may be identified as the content when the user is the personal air flight traveler (e.g., a recommendation for a local tiki bar, a jungle tour, a monument, etc.). Business trip content may be identified as the content when the user is the business air flight traveler (e.g., directions to an office supply store, restaurants near a hotel district, car rental information, internet hotspots, coffee shops, directions to a convention center hosting a business event, etc.).

In an example of generating the recommendation, user signals associated with the user may be evaluated to identify a user interest of the user. For example, a social network profile, emails, calendar data, messages, blogs, search history, browsing history, check-in data, user shared images, and/or a variety of other user signals may be evaluated to determine that the user has an interest in running. Accordingly, the recommendation may be generated to comprise content recommending a local hiking trail.

In another example, the content may be selected for the recommendation based upon whether the user is traveling to a home location or a remote location that is a threshold distance from the home location. For example, the content may comprise a new article associated with the home location (e.g., local election results), an event within a threshold distance of the home location (e.g., a farmer's market event), traffic information for the home location, local weather, etc. when the user is traveling to the home location. The content may comprise weather information, tourist activity content, car rental information, hotel rental information, restaurant information, or other travel content for the destination location when the user is traveling to the remote location.

At 412, the recommendation may be provided to the user. For example, the recommendation may be provided as a mobile alert, an email, a text message, a social network post or message, through an app or personal assistant functionality, etc. The recommendation may comprise the content or links to the content (e.g., a link to search results, a link to open a hotel booking app, etc.).

In an example, locational data associated with a second device of a second user may be evaluated to identify a second set of location points. Second location point pairings may be generated from the second set of location points. Responsive to a threshold amount of the location point pairings and the second location point pairings being indicative of air flight travel between similar locations for the user and the second user, the second user may be determined to be a co-air flight traveler with the user (e.g., a co-worker, a spouse, family, etc.). In this way, recommendations may be tailored and provided to the user and the second user.

In an example, historic travel data for the user may be evaluated to identify an inferred future trip for the user. For example, the historic travel data may indicate that the user routinely travels by air flight on the first Monday of the month to Charlotte. Accordingly, a travel suggestion comprising air flight booking information, hotel booking information, car rental information, destination activity information, and/or other content suggestions for an inferred destination of the inferred future trip (e.g., for traveling to Charlotte on the first Monday of the next month) may be generated and provided to the user.

Figure 5:
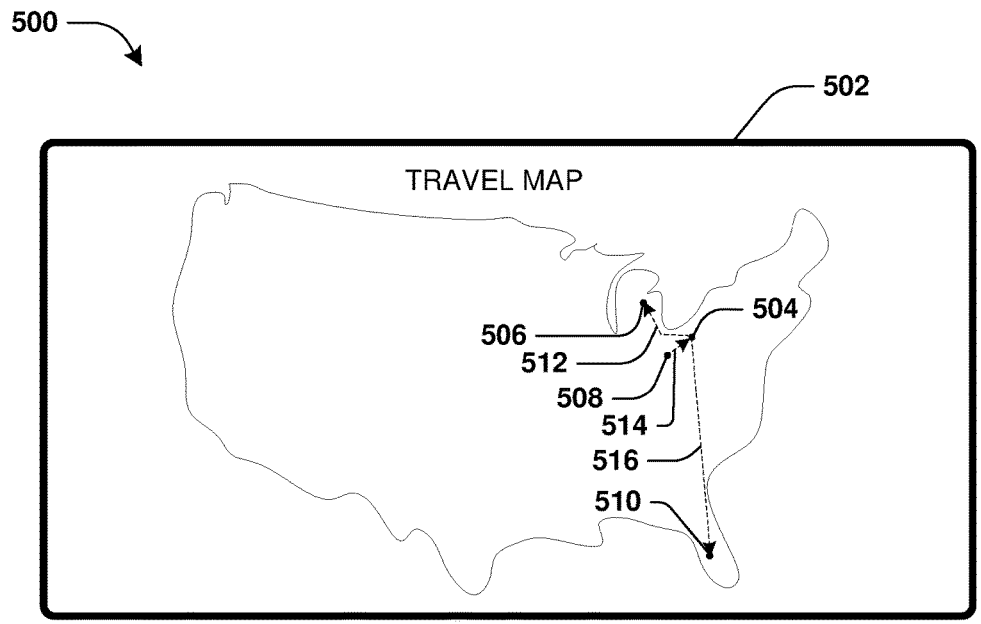
FIG. 5 is a component block diagram illustrating an example system for providing recommendations to travelers, where a recommendation is provided based upon a user being a personal air flight traveler traveling to a vacation destination.
Figure 5:
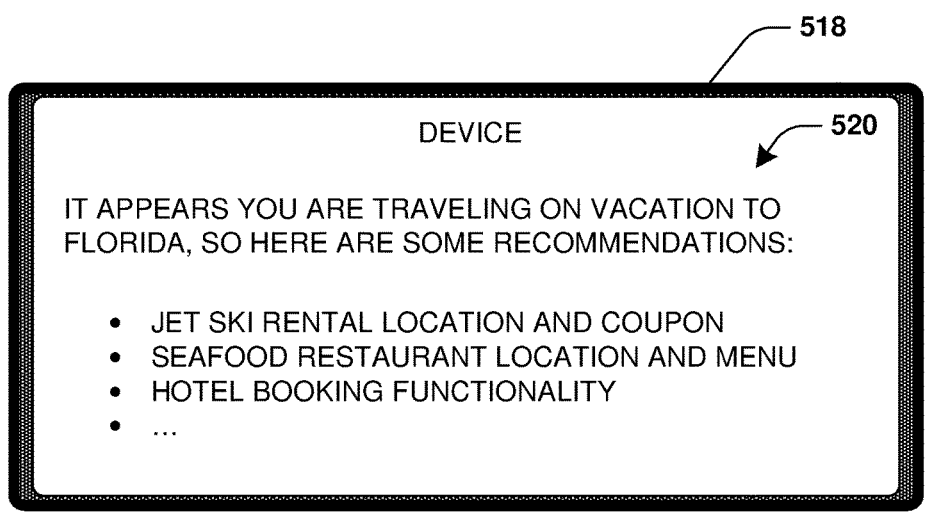

FIG. 5 illustrates an example of a system 500 for providing recommendations to travelers. A travel map 502 illustrates locational data provided by a device 518 of a user (e.g., a set of time ordered location points such as longitude/latitude values). For example, the locational data may comprise a home location point 504 (e.g., a location indicative of a home of the user), a first remote location point 506, a second remote location point 508, a third remote location point 510, and/or other location points not illustrated. Location point pairings may be generated from the location points, where the location point pairings may comprise combinations of location points traveled between by the user. For example, a first location point pairing 512 may comprise the home location point 504 as a departure location point and the first remote location point 506 as an arrival location point. A second location point pairing 514 may comprise the second remote location point 508 as a departure location point and the home location point 504 as an arrival location point. A third location point pairing 516 may comprise the home location point 504 as a departure location point and the third remote location point 510 as an arrival location point.

The location point pairings may be filtered based upon various filter criteria. For example, the second location point pairing 514 may be filtered/removed because a distance between the second remote location point 508 and the home location point 504 (e.g., 127 kilometers) may not exceed an air flight travel distance threshold (e.g., little to no air flights would be scheduled for such a small distance), and thus there may be a relatively high likelihood that the user did not fly from the second remote location point 508 to the home location point 504. Additionally, an average speed for traveling between the second remote location point 508 and the home location point 504 (e.g., the distance and timestamp data of the second remote location point 508 and the home location point 504 may be used to calculate the average speed) may not exceed an air flight speed threshold, thus indicating that the user utilized a slower mode of transportation such as a car.

In an example, the third location point pairing 516 may be identified as a target location point pairing based the third location point pairing 516 having a likelihood of recent air flight travel above a threshold or having a highest likelihood of recent air flight travel of the set of location point pairings. The likelihood may be determined based upon various factors such as a confidence that the user traveled by air flight from the home location point 504 to the third remote location point 510 based upon average speed, timing between timestamp data of the home location point 504 and the third remote location point 510, distance between the home location point 504 and the third remote location point 510, verification against an air flight schedule indicating that there was or was not a scheduled air flight between the home location point 504 and the third remote location point 510 during when the home location point 504 and the third remote location point 510 were generated, verification against an airport location repository indicating whether the home location point 504 and the third remote location point 510 are within various distance thresholds of airports, etc.

In this way, the third remote location point 510 may be determined as a target destination location, such as Florida. A recommendation 520 may be generated with content corresponding to the target destination location. For example, the recommendation 520 may suggest a jet ski rental location and coupon, a seafood restaurant location and menu, hotel booking functionality, and/or other personal/vacation travel content based upon a determination that the user appears to be a personal air flight traveler (e.g., the user historically travels to Florida once a year from Sunday to Saturday). The recommendation 520 may be provided to the user, such as through the device 518.

Figure 6:
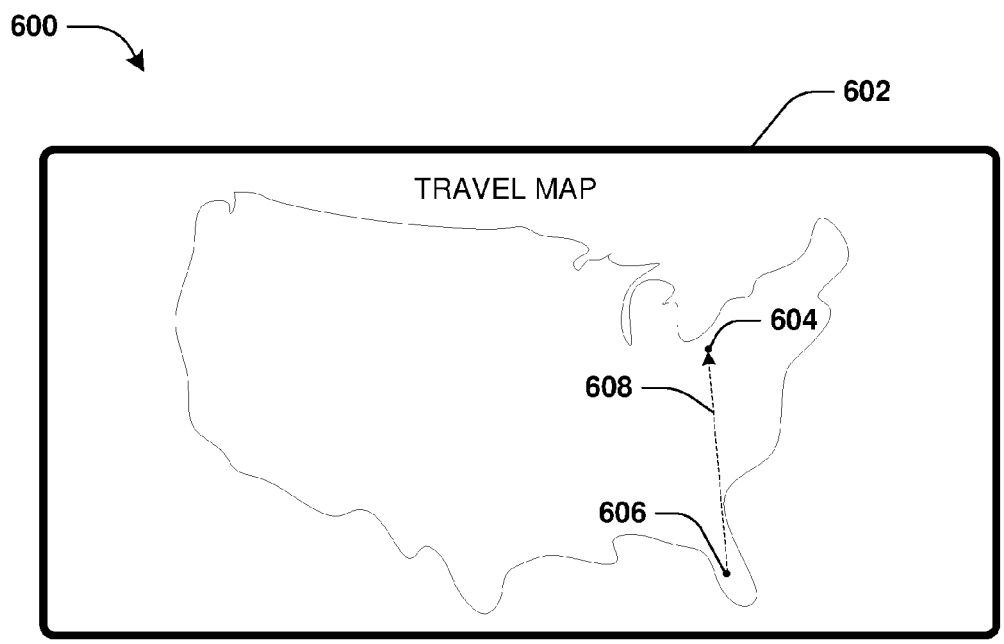
FIG. 6 is a component block diagram illustrating an example system for providing recommendations to travelers, where a recommendation is provided based upon a user flying home.
Figure 6:
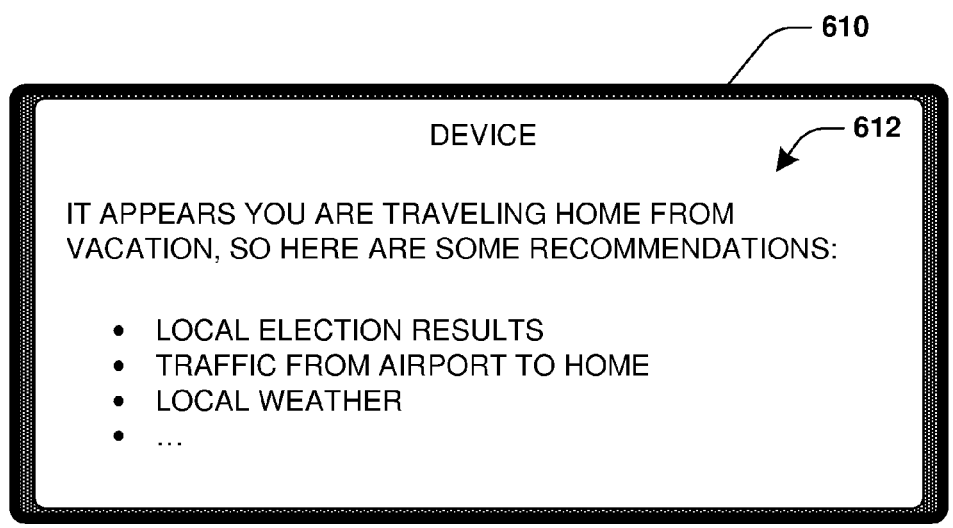

FIG. 6 illustrates an example of a system 600 for providing recommendations to travelers. A travel map 602 illustrates locational data provided by a device 610 of a user (e.g., time ordered location points such as longitude/latitude values). For example, the locational data may comprise a home location point 604 (e.g., a location indicative of a home of the user), a remote location point 606, and/or other location points not illustrated. Location point pairings may be generated from the location points, where the location point pairings may comprise combinations of locations points traveled between by the user. For example, a location point pairing 608 may comprise the remote location point 606 as a departure location point and the home location point 604 as an arrival location point. A recommendation 612 may be generated for the location point pairing 608. The recommendation 612 may comprise content corresponding to local election results, traffic from a home airport to the user's home, local weather, and/or other information that may be relevant to the user once the user has arrived home. The recommendation 612 may be provided to the user, such as through the device 610.

Figure 7:
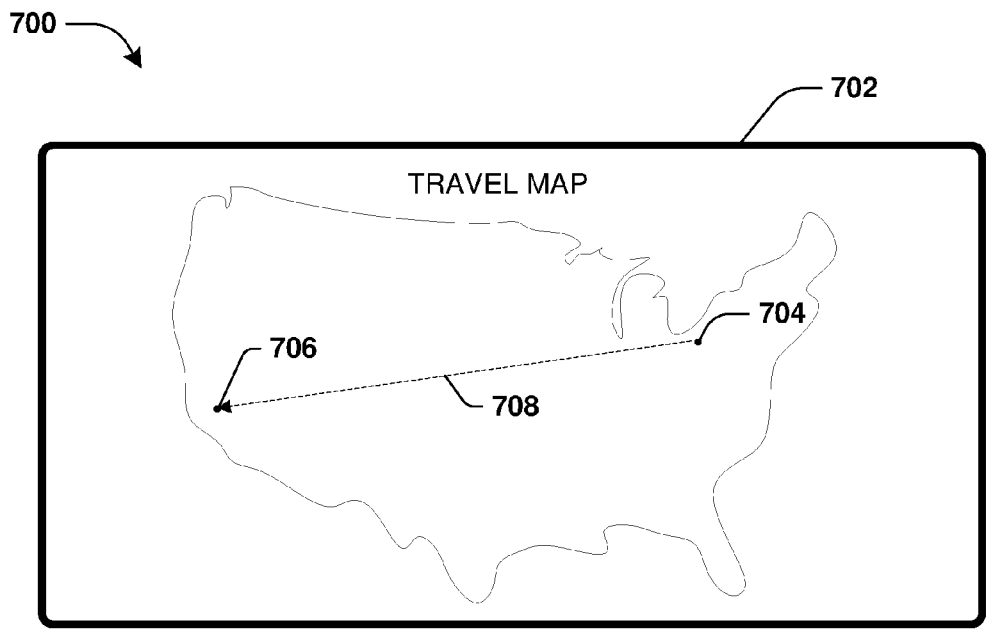
FIG. 7 is a component block diagram illustrating an example system for providing recommendations to travelers, where a recommendation is provided based upon a user being a business air flight traveler.
Figure 7:

FIG. 7 illustrates an example of a system 700 for providing recommendations to travelers. A travel map 702 illustrates locational data provided by a device 710 of a user (e.g., time ordered location points such as longitude/latitude values). For example, the locational data may comprise a home location point 704 (e.g., a location indicative of a home of the user), a remote location point 706, and/or other location points not illustrated. Location point pairings may be generated from the location points, where the location point pairings may comprise combinations of locations points traveled between by the user. For example, a location point pairing 708 may comprise the home location point 704 as a departure location point and the remote location point 706 as an arrival location point. A recommendation 712 may be generated for the location point pairing 708. The recommendation 712 may comprise content corresponding to hotel recommendations, restaurant recommendations near a hotel district, car rental websites, a running trail location (e.g., a user signal such as a social network post may indicate that the user is an avid daily runner), and/or other information that may be relevant to the user once the user has arrived at the remote location point 706 that is indicative of the user traveling for business (e.g., the user routinely travels to the remote location point 706 during the week). The recommendation 712 may be provided to the user, such as through the device 710.

Figure 8:
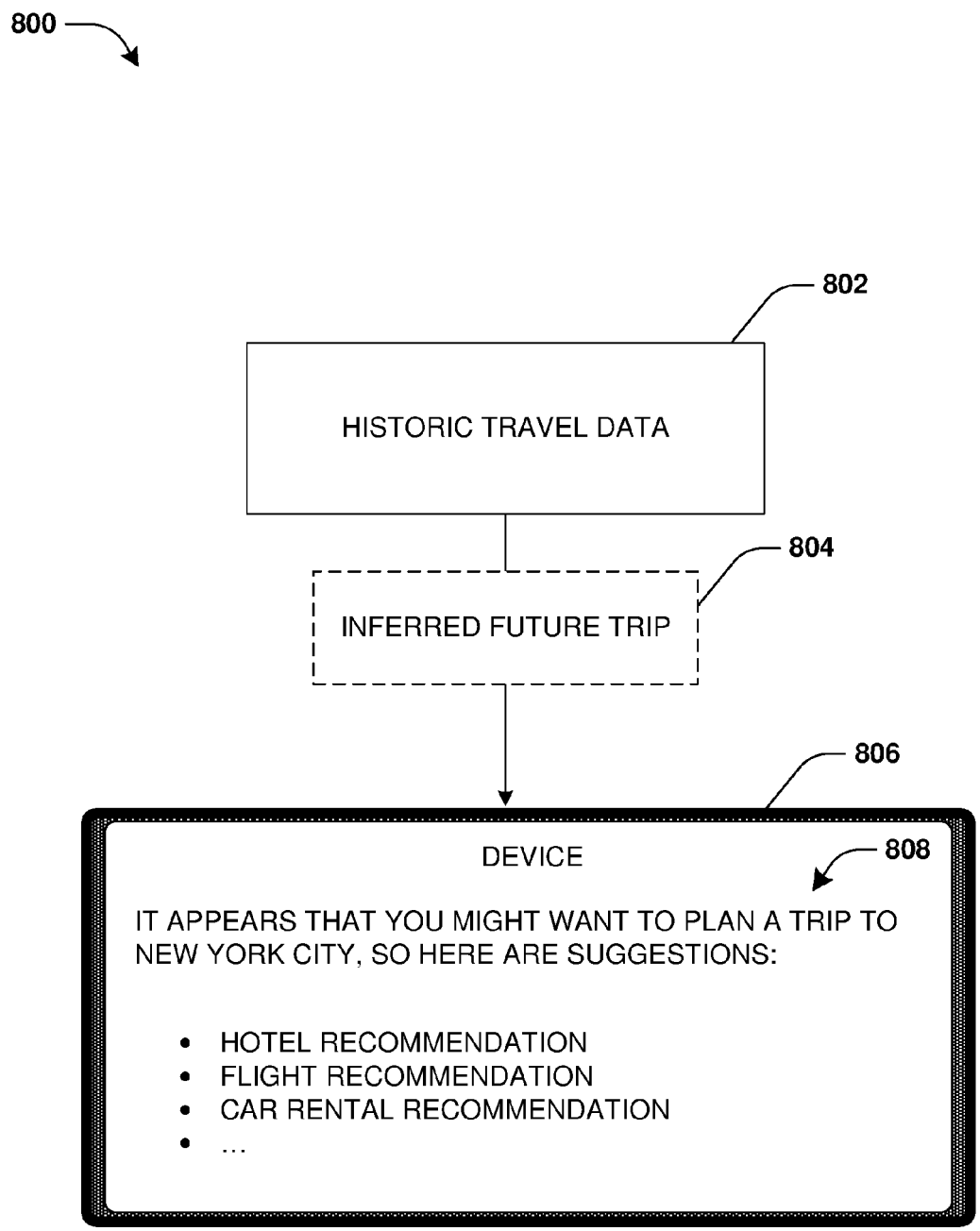
FIG. 8 is a component block diagram illustrating an example system for providing a travel suggestion for an inferred future trip of a user.

FIG. 8 illustrates an example of a system 800 for providing travel suggestions for inferred future trips for users. For example, historic travel data 802 (e.g., locational data of a user, social network posts about traveling, emails about traveling, check-in data, hotel email receipts, calendar entries, etc.) of the user may be evaluated to identify an inferred future trip 804 of the user to an inferred destination location. For example, the historic travel data 802 may indicate that the user routinely travels to New York City the first week of every other month. Accordingly, a travel suggestion 808, comprising a hotel recommendation, a flight recommendation, a car rental recommendation, and/or other content relevant for the user traveling to New York City, may be generated and provided to the user such as through a device 806.

Figure 9:
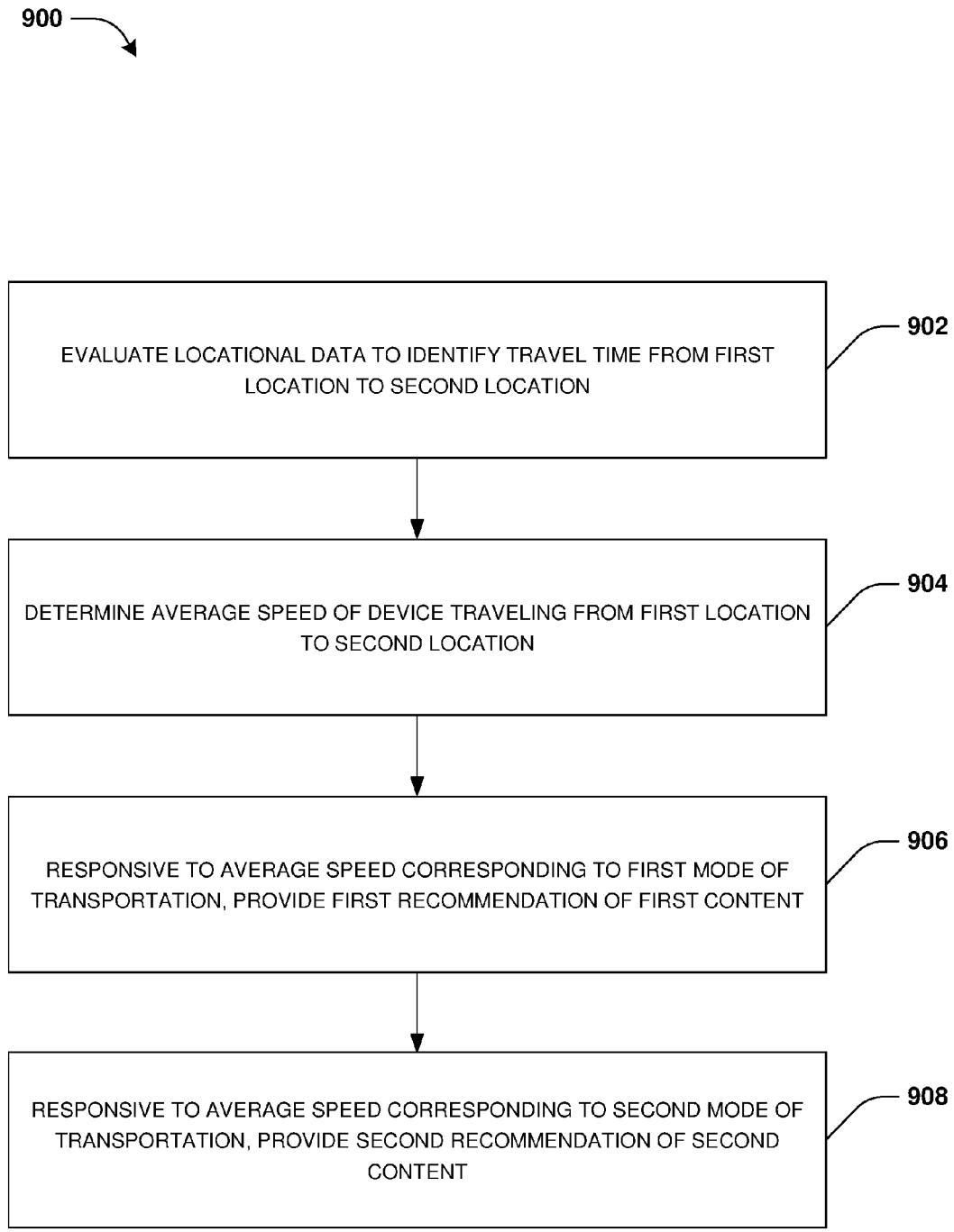
FIG. 9 is a flow chart illustrating an example method for providing recommendations to travelers based upon modes of transportation.

An embodiment of providing recommendations to travelers based upon modes of transportation is illustrated by an example method 900 of FIG. 9. At 902, locational data of a device of a user may be evaluated to identify a travel time from a first location, such as a departure location, to a second location, such as an arrival location. For example, the locational data may indicate that the user departed from City (A) at a first point in time and arrived at City (B) at a second point in time. At 904, an average speed of the device traveling from the first location to the second location may be determined based upon the travel time and a distance between the first location and the second location. In an example, a first data structure (e.g., a first table) may correlate speeds of travel to modes of transportation. For example, a first mode of transportation (e.g., a commercial airliner) may be correlated to a first speed value or first speed range indicative of commercial air flight (e.g., speeds between about 321 kilometers per hour and about 804 kilometers per hour or any other speed values). A second mode of transportation (e.g., a private jet) may be correlated to a second speed value or a second speed range indicative of private air flight (e.g., speeds above about 804 kilometers per hour or any other speed values). A third mode of transportation (e.g., a train) may be correlated to a third speed value or a third speed range indicative of train travel (e.g., speeds from about 112 kilometers per hour to about 321 kilometers per hour or any other speed values). It may be appreciated that other modes of transportation may be defined, such as jogging, running, biking, driving a car, etc.

At 906, responsive to the average speed corresponding to the first mode of transportation (e.g., traveling by a commercial jetliner), first content may be identified based upon the first mode of transportation (e.g., an article and purchase functionality for a new smart watch costing $250). A first recommendation, of the first content, may be provided to the user. At 908, responsive to the average speed corresponding to the second mode of transportation (e.g., traveling by a private jet), second content may be identified based upon the second mode of transportation (e.g., a user review and purchase functionality for a luxury smart watch costing $2,350). A second recommendation, of the second content, may be provided to the user. In this way, recommendations of content may be tailored based upon a mode of transportation of a user (e.g., a recommendation of a new running watch may be provided for a running mode of transportation).

FIG. 10 illustrates an example 1000 of a first data structure 1002 (e.g., a first table) correlating speed ranges (e.g., a speed range indicative of traveling by a certain mode of transportation) to modes of transportation. For example, a running mode of transportation may be correlated to a first speed range of about 5 kilometers per hour to about 16 kilometers per hour or any other speed range or value. A train mode of transportation may be correlated to a second speed range of about 112 kilometers per hour to about 321 kilometers per hour or any other speed range or value. A commercial airliner mode of transportation may be correlated to a third speed range of about 321 kilometers per hour to about 804 kilometers per hour or any other speed range or value. A private jet mode of transportation may be correlated to a fourth speed range of about 804 kilometers per hour to about 1144 kilometers per hour or any other speed range or value. It may be appreciated that other modes of transportation may be correlated to other speed ranges or values (e.g., a vehicle mode of transportation may be correlated to a fifth speed range of about 16 kilometers per hour to about 112 kilometers per hour).

A second data structure 1004 maps users to modes of transportation based upon average speeds used to travel between two locations. For example, a user (A) may have departed from a City (A) and arrived at a City (B) in 2 hours and 15 minutes. An average speed of 164 kilometers per hour may be determined based upon the 2 hours and 15 minutes travel time and a distance between the City (A) and the City (B). Because the 164 kilometers per hour may be within the second speed range, the train mode of transportation may be determined for the user (A)'s trip. A third data structure 1006, correlating modes of transportation to content for recommending to users, may be queried to identify tablet purchase functionality content correlated to the train mode of transportation, which may be provided to the user (A) as a first recommendation.

A user (B) may have departed from the City (A) and arrived at a City (C) in 3 hours and 10 minutes. An average speed of 643 kilometers per hour may be determined based upon the 3 hours and 10 minutes travel time and a distance between the City (A) and the City (C). Because the 643 kilometers per hour may be within the third speed range, the commercial airliner mode of transportation may be determined for the user (B)'s trip. The third data structure 1006 may be queried to identify a smart watch user review of a smart watch correlated to the commercial airliner mode of transportation, which may be provided to the user (B) as a second recommendation.

A user (C) may have departed from the City (C) and arrived at a City (D) in 5 hours and 1 minute. An average speed of 1,046 kilometers per hour may be determined based upon the 5 hours and 1 minute travel time and a distance between the City (C) and the City (D). Because the 1,046 kilometers per hour may be within the fourth speed range, the private jet mode of transportation may be determined for the user (C)'s trip. The third data structure 1006 may be queried to identify a luxury smart watch article of a new luxury smart watch correlated to the private jet mode of transportation, which may be provided to the user (C) as a third recommendation.

A user (D) may have departed from a City (E) and arrived at a City (F) in 1 hour. An average speed of 8 kilometers per hour may be determined based upon the 1 hour travel time and a distance between the City (E) and the City (F). Because the 8 kilometers per hour may be within the first speed range, the running mode of transportation may be determined for the user (D)'s trip. The third data structure 1006 may be queried to identify an article about a running watch correlated to the running mode of transportation, which may be provided to the user (D) as a fourth recommendation.

Figure 11:
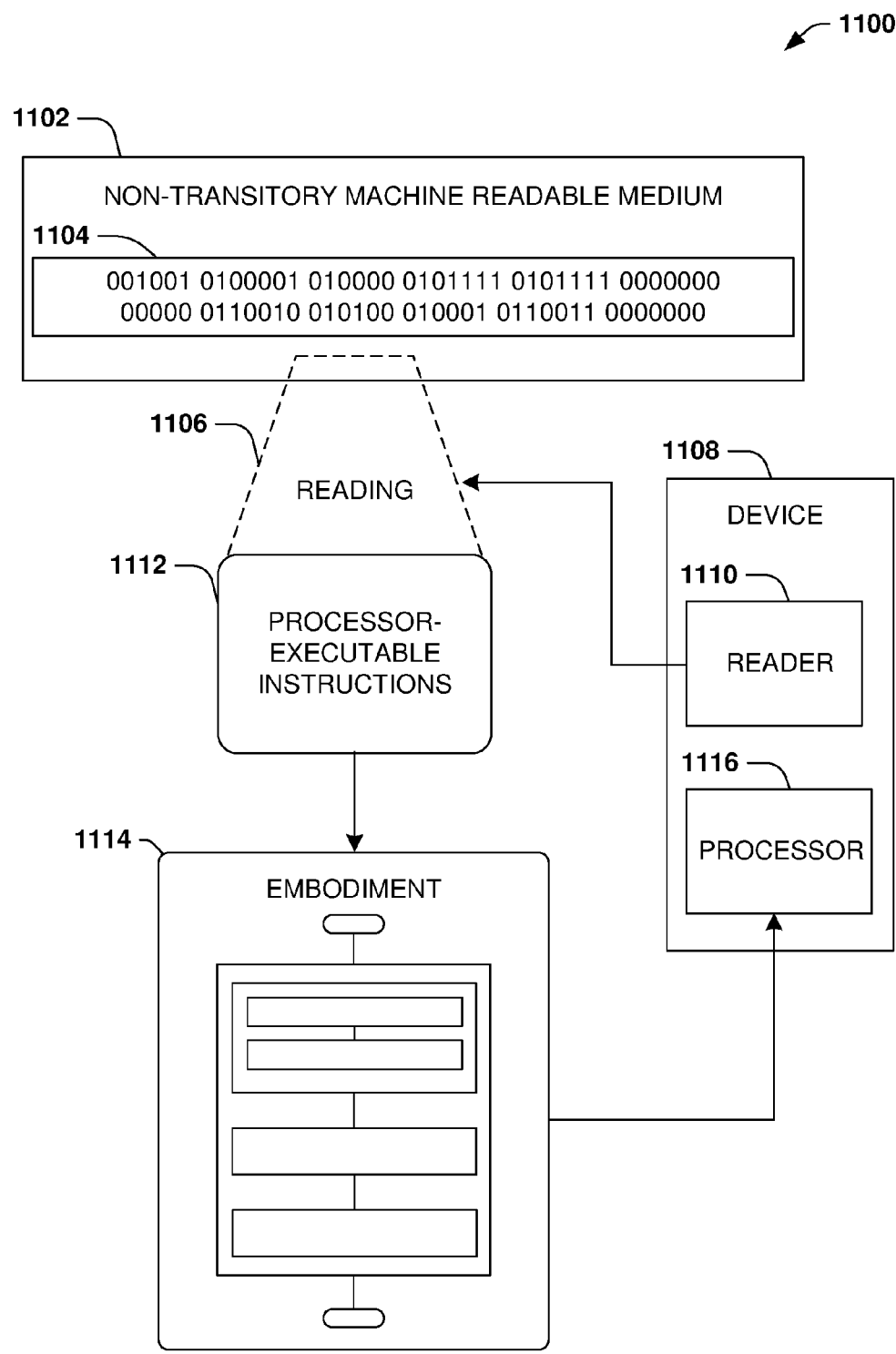
FIG. 11 is an illustration of a scenario featuring an example non-transitory machine readable medium in accordance with one or more of the provisions set forth herein.

FIG. 11 is an illustration of a scenario 1100 involving an example non-transitory machine readable medium 1102. The non-transitory machine readable medium 1102 may comprise processor-executable instructions 1112 that when executed by a processor 1116 cause performance (e.g., by the processor 1116) of at least some of the provisions herein. The non-transitory machine readable medium 1102 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1102 stores computer-readable data 1104 that, when subjected to reading 1106 by a reader 1110 of a device 1108 (e.g., a read head of a hard disk drive, or a read operation invoked on a solid-state storage device), express the processor-executable instructions 1112. In some embodiments, the processor-executable instructions 1112, when executed cause performance of operations, such as at least some of the example method 400 of FIG. 4 and/or at least some of the example method 900 of FIG. 9, for example. In some embodiments, the processor-executable instructions 1112 are configured to cause implementation of a system, such as at least some of the example system 500 of FIG. 5, at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
identifying a set of location points indicative of one or more locations at which a device of a user has been located;
generating location point pairings from the set of location points;
evaluating the location point pairings to identify a target location point pairing indicative of air flight travel from a target departure location point to a target arrival location point, wherein the evaluating the location point pairings comprises:
calculating, based upon timestamp data associated with a location point pairing, an average speed for traveling from a departure location point of the location point pairing to an arrival location point of the location point pairing; and
responsive to the average speed not exceeding an air flight speed threshold, filtering the location point pairing;
determining that the user of the device is an air flight traveler to a destination location corresponding to the target arrival location point; and
responsive to determining that the user of the device is the air flight traveler to the destination location:
generating a recommendation of content for the destination location; and
providing the recommendation to the device of the user,
wherein at least one of the set of location points or the location point pairings is stored in a computational cluster configured to store data in a distributed computing environment, wherein computational processing of at least one of the set of location points or the location point pairings utilizing the computational cluster is associated with a reduction in computational processing time.

2. The method of claim 1, wherein the generating location point pairings comprises:
filtering one or more location point pairings that do not exceed an air flight travel distance threshold.

3. The method of claim 1, wherein the filtering the location point pairing generates filtered location point pairings.

4. The method of claim 1, comprising:
determining the set of location points based upon location data tracked using at least one of a GPS unit or a network.

5. The method of claim 1, wherein the evaluating the location point pairings comprises:
calculating a second average speed for traveling from a second departure location point of a second location point pairing to a second arrival location point of the second location point pairing based upon second timestamp data associated with the second location point pairing; and
responsive to the second average speed exceeding a physical travel threshold, filtering the second location point pairing.

6. The method of claim 1, wherein the evaluating the location point pairings comprises:
evaluating an airport location repository using the target arrival location point to identify an arrival airport within a distance threshold of the target arrival location point.

7. The method of claim 1, wherein the evaluating the location point pairings comprises:
evaluating an airport location repository using the target arrival location point to identify an inferred arrival airport within an inferred distance threshold of the target arrival location point.

8. The method of claim 3, wherein evaluation of the location point pairings prior to performance of the filtering is associated with processing a first amount of locational data and evaluation of the filtered location point pairings is associated with processing a second amount of locational data less than the first amount of locational data.

9. The method of claim 1, comprising:
evaluating the target location point pairing to determine whether the user is the air flight traveler or is a traveler ride provider.

10. The method of claim 1, comprising:
evaluating historic travel data for the user to determine whether the user is a business air flight traveler or a personal air flight traveler.

11. The method of claim 1, comprising:
identifying a second set of location points indicative of one or more second locations at which a second device of a second user has been located;
generating second location point pairings from the second set of location points; and
responsive to a threshold amount of the location point pairings and the second location point pairings being indicative of air flight travel between similar locations for the user and the second user, determining that the second user is a co-air flight traveler with the user.

12. The method of claim 1, comprising:
verifying the target location point pairing with an air flight schedule.

13. The method of claim 1, wherein the generating a recommendation of content for the destination location comprises:
responsive to determining that the destination location is a home location of the user, identifying at least one of weather content for the home location, a news article associated with the home location, an event within a threshold distance of the home location, or traffic information for the home location as the content for the recommendation.

14. The method of claim 1, wherein the generating a recommendation of content for the destination location comprises:
responsive to determining that the destination location is a threshold distance from a home location of the user, identifying at least one of weather content for the destination location, tourist activity content for the destination location, car rental information, hotel rental information, restaurant information, or travel content for the destination location as the content for the recommendation.

15. The method of claim 1, wherein the generating a recommendation of content for the destination location comprises:
responsive to determining that the user is a business air flight traveler, identifying business trip content as the content for the recommendation.

16. The method of claim 1, wherein the generating a recommendation of content for the destination location comprises:
responsive to determining that the user is a personal air flight traveler, identifying vacation content as the content for the recommendation.

17. The method of claim 1, wherein the generating a recommendation of content for the destination location comprises:
evaluating user signals associated with the user to identify a user interest of the user; and
identifying the content for the recommendation as information relating the user interest.

18. The method of claim 1, comprising:
evaluating historic travel data for the user to identify an inferred future trip for the user;
generating a travel suggestion comprising at least one of air flight booking information, hotel booking information, car rental information, or destination activity information for an inferred destination of the inferred future trip; and
providing the travel suggestion to the user.

19. A computing device comprising:
a processor; and
memory comprising processor-executable instructions that when executed by the processor cause performance of operations, the operations comprising:
identifying a set of location points indicative of one or more locations at which a device of a user has been located;
generating location point pairings from the set of location points, a location point pairing comprising a departure location point and an arrival location point;
identifying a second set of location points indicative of one or more second locations at which a second device of a second user has been located;
generating second location point pairings from the second set of location points;
responsive to a threshold amount of the location point pairings and the second location point pairings being indicative of air flight travel between similar locations for the user and the second user, determining that the second user is a co-air flight traveler with the user; and
responsive to determining that the second user is the co-air flight traveler with the user:
generating a recommendation of content for a destination location; and
providing the recommendation to at least one of the device of the user or the second device of the second user,
wherein at least one of the set of location points, the second set of location points, the location point pairings or the second location point pairings is stored in a computational cluster configured to store data in a distributed computing environment, wherein computational processing of at least one of the set of location points, the second set of location points, the location point pairings or the second location point pairings utilizing the computational cluster is associated with a reduction in computational processing time.

20. A non-transitory machine readable medium having stored thereon processor-executable instructions that when executed cause performance of operations, the operations comprising:
identifying a set of location points indicative of one or more locations at which a device of a user has been located;
generating location point pairings from the set of location points, a location point pairing comprising a departure location point and an arrival location point;
evaluating the location point pairings to identify a target location point pairing indicative of air flight travel from a target departure location point to a target arrival location point;
identifying a second set of location points indicative of one or more second locations at which a second device of a second user has been located;
generating second location point pairings from the second set of location points;
responsive to a threshold amount of the location point pairings and the second location point pairings being indicative of air flight travel between similar locations for the user and the second user, determining that the second user is a co-air flight traveler with the user in association with at least part of the air flight travel from the target departure location point to the target arrival location point; and
responsive to determining that the second user is the co-air flight traveler with the user:
generating a recommendation of content for a destination location; and
providing the recommendation to at least one of the device of the user or the second device of the second user,
wherein at least one of the set of location points, the second set of location points, the location point pairings or the second location point pairings is stored in a computational cluster configured to store data in a distributed computing environment, wherein computational processing of at least one of the set of location points, the second set of location points, the location point pairings or the second location point pairings utilizing the computational cluster is associated with a reduction in computational processing time.

* * * * *